United States Patent
Yonishi

(10) Patent No.: US 11,012,624 B2
(45) Date of Patent: May 18, 2021

(54) INFORMATION PROCESSING APPARATUS, INFORMATION PROCESSING METHOD, AND STORAGE MEDIUM FOR DETERMINING WHETHER TO PERFORM PREPROCESSING TO EXCLUDE SETTING INFORMATION RELATED TO AN IMAGE

(71) Applicant: CANON KABUSHIKI KAISHA, Tokyo (JP)

(72) Inventor: Osamu Yonishi, Chigasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 130 days.

(21) Appl. No.: 16/055,418

(22) Filed: Aug. 6, 2018

(65) Prior Publication Data
US 2019/0052814 A1 Feb. 14, 2019

(30) Foreign Application Priority Data
Aug. 9, 2017 (JP) ............................ JP2017-154497

(51) Int. Cl.
*H04N 5/232* (2006.01)
*H04N 5/225* (2006.01)
*H04N 5/445* (2011.01)

(52) U.S. Cl.
CPC ..... *H04N 5/232933* (2018.08); *H04N 5/2259* (2013.01); *H04N 5/23203* (2013.01); *H04N 5/23206* (2013.01); *H04N 5/23216* (2013.01); *H04N 5/23299* (2018.08); *H04N 5/232945* (2018.08); *H04N 5/44504* (2013.01)

(58) Field of Classification Search
CPC ............................................... H04N 5/232933
See application file for complete search history.

(56) References Cited

U.S. PATENT DOCUMENTS

| | | | |
|---|---|---|---|
| 8,194,127 B2 * | 6/2012 | Kang | G06T 7/32 348/143 |
| 2006/0062480 A1 * | 3/2006 | Fujiyama | H04N 19/139 382/232 |

(Continued)

FOREIGN PATENT DOCUMENTS

| | | |
|---|---|---|
| CN | 104272371 A | 1/2015 |
| CN | 105744271 A | 7/2016 |

(Continued)

*Primary Examiner* — Cynthia Segura
(74) *Attorney, Agent, or Firm* — Canon U.S.A., Inc. IP Division

(57) ABSTRACT

An information processing apparatus includes an obtaining unit configured to obtain first setting information including information related to a first specified area in an image and related to image analysis processing and second setting information including information related to a second specified area in the image and related to the image analysis processing of the same type as the first setting information, wherein the second setting information has been created before the first setting information, a determination unit configured to determine an overlapped area of the first and second specified areas on a basis of the first setting information and the second setting information, and a decision unit configured to decide processing to be executed with respect to at least one of the first setting information and the second setting information in accordance with a determination result of the determination unit.

12 Claims, 14 Drawing Sheets

(56) References Cited

U.S. PATENT DOCUMENTS

| | | | |
|---|---|---|---|
| 2007/0115356 A1* | 5/2007 | Kang | G08B 13/19686 |
| | | | 348/143 |
| 2007/0201749 A1 | 8/2007 | Yamauchi | |
| 2008/0240250 A1 | 10/2008 | Lin | |
| 2009/0256925 A1* | 10/2009 | Yoshizumi | H04N 5/23219 |
| | | | 348/222.1 |
| 2010/0119177 A1* | 5/2010 | Suzuki | G06K 9/00771 |
| | | | 382/307 |
| 2011/0051004 A1* | 3/2011 | Mori | H04N 5/272 |
| | | | 348/598 |
| 2011/0096922 A1* | 4/2011 | Oya | H04N 7/183 |
| | | | 380/28 |
| 2011/0228119 A1* | 9/2011 | Maruyama | H04N 5/23293 |
| | | | 348/222.1 |
| 2014/0098092 A1* | 4/2014 | Isokawa | G06T 7/0012 |
| | | | 345/419 |
| 2014/0160282 A1* | 6/2014 | Yamagi | H04N 7/18 |
| | | | 348/143 |
| 2014/0368646 A1* | 12/2014 | Traff | H04N 5/33 |
| | | | 348/143 |
| 2016/0253579 A1* | 9/2016 | Bamba | G06K 9/00771 |
| | | | 382/103 |
| 2017/0041608 A1 | 2/2017 | Yokomizo | |
| 2018/0033151 A1* | 2/2018 | Matsumoto | G06F 21/84 |
| 2019/0268537 A1* | 8/2019 | Jang | G06T 3/40 |

FOREIGN PATENT DOCUMENTS

| | | |
|---|---|---|
| CN | 106407642 A | 2/2017 |
| JP | 5555044 B2 | 7/2014 |
| JP | 2016-123004 A | 7/2016 |
| JP | 2017034495 A | 2/2017 |
| KR | 10-1674586 B1 | 11/2016 |
| KR | 10-1699014 B1 | 1/2017 |

* cited by examiner

INFORMATION PROCESSING APPARATUS, INFORMATION PROCESSING METHOD, AND STORAGE MEDIUM FOR DETERMINING WHETHER TO PERFORM PREPROCESSING TO EXCLUDE SETTING INFORMATION RELATED TO AN IMAGE

BACKGROUND OF THE INVENTION

Field of the Invention

The present invention relates to an information processing apparatus, an information processing method, and a storage medium.

Description of the Related Art

In recent years, various new functions have been mounted to a network camera, and setting items are prepared for each of the functions. The number of methods of specifying a partial area in a shot image by a user is increased as a method of setting the respective functions. For example, when a function of a privacy mask, a region of interest (ROI), moving object detection, intrusion detection, or the like is set, a method of specifying a predetermined area in an image is used.

However, when the number of functions in the network camera is increased as described above, it becomes difficult for the user to remember a position or a size of the area that has been previously specified by the user itself. As a result, in a case where a plurality of specified areas are set with regard to the function settings of the same type, the specified areas may be overlapped with each other in some cases. In this case, there is a fear that a result desired by the user is not obtained in the network camera functions.

To perform positioning of a plurality of cameras, Japanese Patent Laid-Open No. 2016-123004 describes a method of detecting an overlap of imaging areas of the cameras and displaying an overlap amount of the mutual imaging areas on a screen.

In addition, Japanese Patent No. 5555044 describes a method of issuing a warning to a user that a video at the time of event occurrence is hidden by a privacy mask when areas respectively specified by a privacy mask function and an event detection function of a network camera are overlapped with each other.

For example, in the case of a function of reducing the communication data amount in an area outside the ROI, when the previously set specified area is contained in the newly set specified area, there is a fear that a bit rate in the newly set specified area may be unexpectedly decreased depending on setting contents. In the case of the intrusion detection function, when the previously set specified area and the newly set specified area are overlapped with each other, a notification of a detection event outside the newly set specified area may occur, or a notification of the detection event may occur plural times with respect to the same intruding object. In this manner, there is a fear that an operation that is not desired by the user may be caused.

In view of the above, an embodiment of the present invention aims at appropriately creating setting information including the area specification and suppressing the number of occasions where an undesired image analysis result is obtained.

SUMMARY OF THE INVENTION

To address the above-described issue, an information processing apparatus according to an aspect of the present invention includes an obtaining unit configured to obtain first setting information including information related to a first specified area in an image and related to image analysis processing and second setting information including information related to a second specified area in the image and related to the image analysis processing of the same type as the first setting information, wherein the second setting information has been created before the first setting information, a determination unit configured to determine an overlapped area of the first specified area and the second specified area on a basis of the first setting information and the second setting information, and a decision unit configured to decide processing to be executed with respect to at least one of the first setting information and the second setting information in accordance with a determination result of the determination unit.

Further features of the present invention will become apparent from the following description of embodiments with reference to the attached drawings.

DESCRIPTION OF THE EMBODIMENTS

Hereinafter, embodiments of the present invention will be described in detail with reference to the accompanying drawings.

It should be noted that embodiments which will be described below are examples of the present invention and may be appropriately modified or altered depending on a configuration of an apparatus to which the present invention is applied or various conditions, and the present invention is not limited to the following description.

First Embodiment

Figure 1:
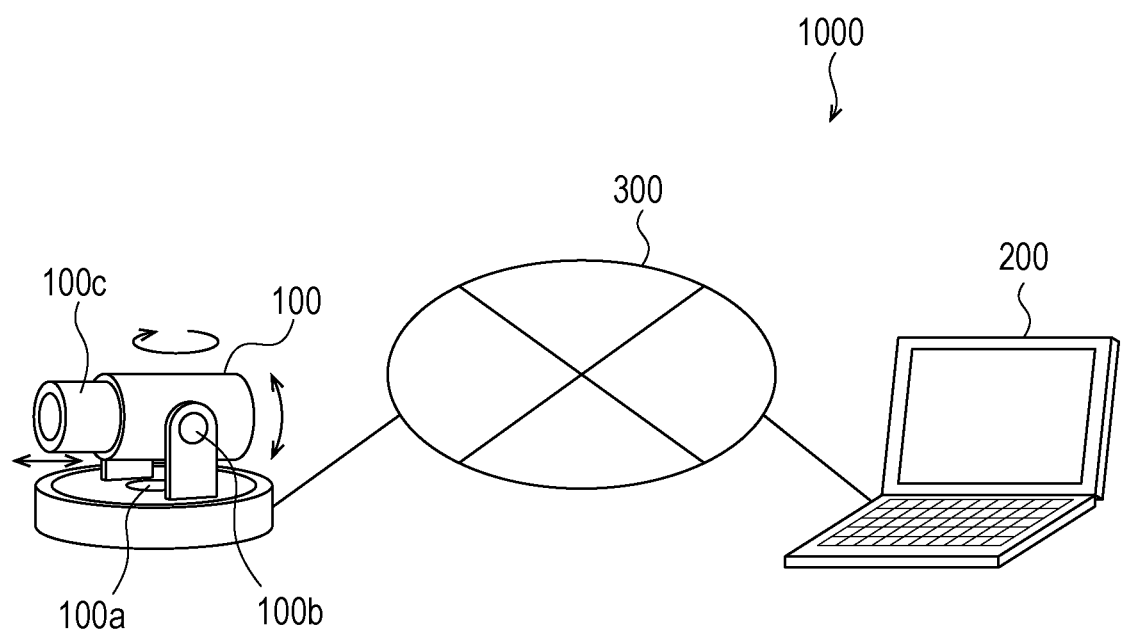
FIG. 1 illustrates a network configuration example of an imaging system according to a present embodiment.

FIG. 1 illustrates a network configuration example of an imaging system 1000 according to the present embodiment. The imaging system 1000 is provided with a network camera (hereinafter, which will be simply referred to as a "camera") 100 and a client apparatus 200. The camera 100 and the client apparatus 200 are connected to each other by a network 300 so as to be communicable with each other. The network 300 is constituted, for example, by a plurality of routers, switches, cables, and the like in conformity to Ethernet (registered trademark) communication specifications. It should be noted that, as long as the communication between the camera 100 and the client apparatus 200 can be performed by a configuration, any communication specifications, scales, and configurations of the network 300 may be adopted. The network 300 may be realized by the internet, a wired local area network (LAN), a wireless LAN, a wide area network (WAN), or any combinations of those.

The camera 100 is an imaging apparatus configured to image an imaging area. The camera 100 includes a pan driving mechanism 100a, a tilt driving mechanism 100b, and a zoom driving mechanism 100c and functions as a pan tilt zoom (PTZ) camera constituted so as to be able to change the imaging area. The pan driving mechanism 100a can change the imaging area of the camera 100 in a pan direction and endlessly rotate the camera 100 by 360°, for example. The tilt driving mechanism 100b can change the imaging area of the camera 100 in a tilt direction and rotate the camera 100 from 0° in a horizontal direction to +180° in an upper direction, for example. The zoom driving mechanism 100c can change the imaging area of the camera 100 in a zoom direction and arbitrary change the viewing angle of the camera 100.

It should be noted that the camera 100 is not limited to the PTZ camera. In addition, the camera 100 may be compatible to Power over Ethernet (PoE) and also have a configuration in which power is supplied via a LAN cable. Furthermore, in FIG. 1, the single camera 100 is connected to the network 300, but a plurality of cameras can also be connected to the network 300.

The client apparatus 200 is constituted by a personal computer (PC) or a terminal apparatus such as a smart phone or a tablet-type PC and can transmit various commands to the camera 100. The commands transmitted to the camera 100 include a command for changing an imaging direction (bearing or orientation) of the camera 100 and a viewing angle, a command for changing an imaging parameter, a command related to image processing, a command for starting transmission of an image, and the like. The client apparatus 200 also receives a response with respect to a command from the camera 100.

The camera 100 changes the imaging direction and the viewing angle in accordance with the command for changing the imaging direction and the viewing angle received from the client apparatus 200. The camera 100 also transmits the image to the client apparatus 200 in accordance with the command for starting the transmission of the image. In response to the above-described command for starting the transmission of the image, the client apparatus 200 performs display control for receiving the image transmitted from the camera 100 and presenting the received image to a user who uses the client apparatus 200.

Figure 2:
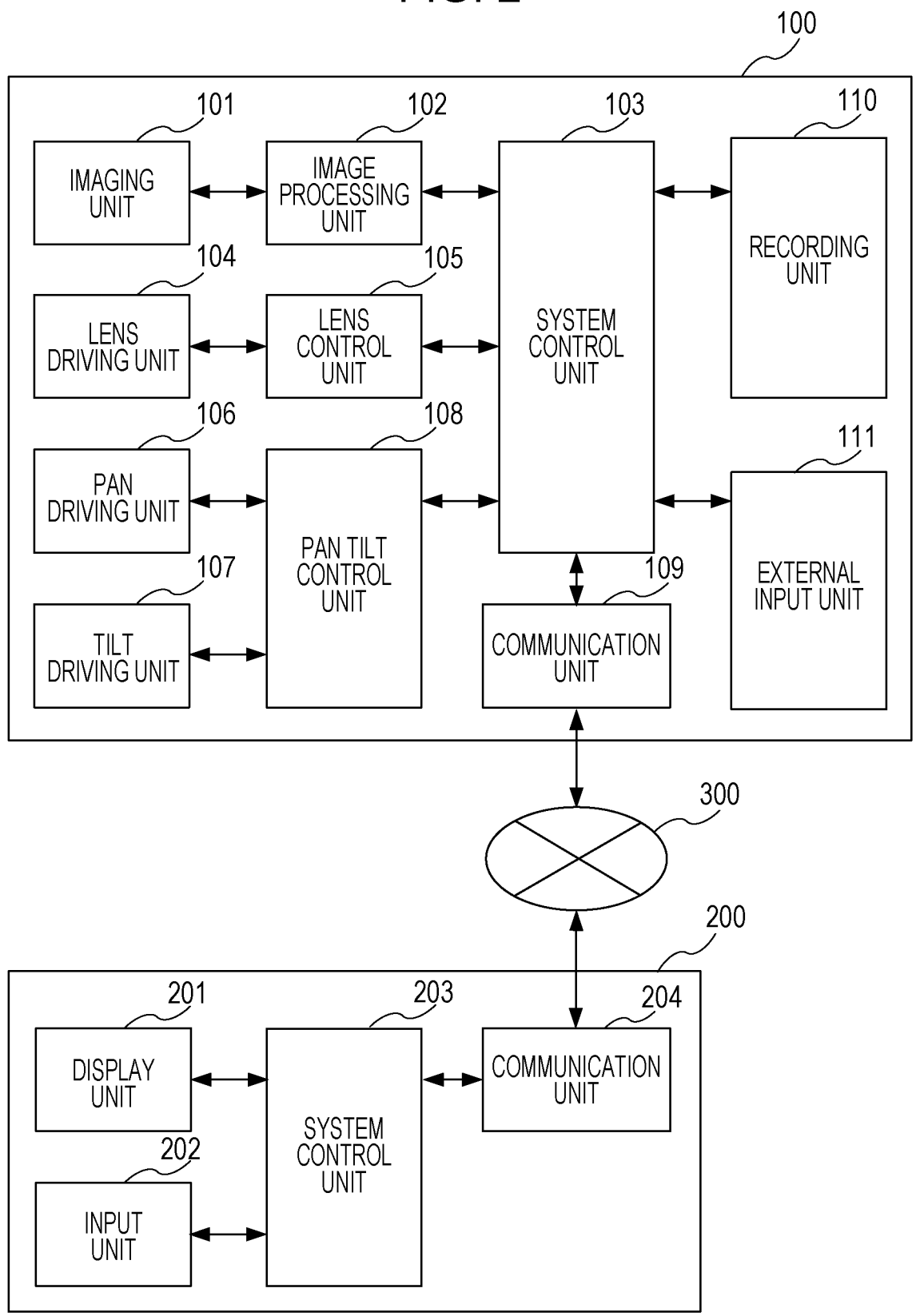
FIG. 2 illustrates configuration examples of a network camera and a client apparatus.

FIG. 2 is a block diagram illustrating configuration examples of the camera 100 and the client apparatus 200. As illustrated in FIG. 2, the camera 100 is provided with an imaging unit 101, an image processing unit 102, a system control unit 103, a lens driving unit 104, a lens control unit 105, a pan driving unit 106, a tilt driving unit 107, a pan/tilt control unit 108, and a communication unit 109. Furthermore, the camera 100 is provided with a recording unit 110 and an external input unit 111. The client apparatus 200 is provided with a display unit 201, an input unit 202, a system control unit 203, and a communication unit 204. The communication unit 109 of the camera 100 and the communication unit 204 of the client apparatus 200 are connected to each other via the network 300 so as to be mutually communicable.

First, a configuration of the camera 100 and functions of the respective units will be described.

The imaging unit 101 is constituted by including a lens and imaging elements such as a complementary metal oxide semiconductor (CMOS) and a charge coupled device (CCD) and performs imaging of an object. The imaging unit 101 also performs processing for converting an optical image focused on an imaging surface into digital electric signals by photoelectric conversion. The image processing unit 102 performs predetermined image processing with respect to the signal after the photoelectric conversion is performed in the imaging unit 101. The above-described image processing includes white balance processing, sharpness processing, and gray scale conversion processing. The image processing unit 102 also generates image data by performing compression coding of the image on which the above-described image processing has been performed and outputs the generated image data to the system control unit 103.

The system control unit 103 analyzes the command received from the client apparatus 200 via the communication unit 109 and performs processing in accordance with the command. Specifically, the system control unit 103 performs a change instruction of the image processing parameter with respect to the image processing unit 102, an instruction for zoom or focus control with respect to the lens control unit 105, or an instruction for the pan/tilt operation with respect to the pan/tilt control unit 108 in accordance with the received command. The system control unit 103 also generates a response with respect to the received camera control command and outputs the generated response to the communication unit 109 such that the response is to be transmitted to the client apparatus 200.

Furthermore, the system control unit 103 performs the image analysis processing with respect to the image received from the image processing unit 102. Herein, the image analysis processing includes privacy mask processing, communication data amount reduction processing based on the ROI specification, moving object detection processing, intrusion detection processing, head count processing, removal detection processing, abandoning detection processing, prank detection processing, passing detection processing, automatic tracking processing, and the like. These image analysis processes are processes for realizing various camera functions. The system control unit 103 may output a result of the above-described image analysis processing to the communication unit 109 such that the result and the image received from the image processing unit 102 are to be transmitted to the client apparatus 200.

In addition, according to the present embodiment, the system control unit 103 creates setting information related to the above-described image analysis processing in accordance with the command received from the client apparatus 200 via the communication unit 109 and records this setting information in the recording unit 110. Herein, the above-described setting information includes information related to a predetermined specified area in the image and information related to the imaging direction and the viewing angle of the camera 100 at a time when the above-described image is shot. In a case where the image analysis processing is the privacy mask processing, the above-described specified area is equivalent to a mask area for protecting privacy. In a case where the image analysis processing is the communication data amount reduction processing based on the ROI specification, the above-described specified area is equivalent to an area where the data amount is to be reduced or an area where the data amount is not to be reduced. Furthermore, in a case where the image analysis processing is the moving object detection processing, the intrusion detection processing, or the like, the above-described specified area is equivalent to a monitoring area for a moving object, an intruding object, or the like.

It should be noted that the above-described setting information is not limited to the above-described configuration and may include, for example, time information indicating a time when the setting information is created.

The lens driving unit 104 is constituted by a driving system such as a focus lens and a zoom lens and a motor serving as a driving source thereof, and an operation of the lens driving unit 104 is controlled by the lens control unit 105. The lens control unit 105 controls the lens driving unit 104 on the basis of the instruction by the system control unit 103. The pan driving unit 106 is constituted by a mechanism driving system that performs a pan operation and a motor serving as a driving source thereof, and an operation of the pan driving unit 106 is controlled by the pan/tilt control unit 108. The tilt driving unit 107 is constituted by a mechanism driving system that performs a tilt operation and a motor serving as a driving source thereof, and an operation of the tilt driving unit 107 is controlled by the pan/tilt control unit 108. The pan/tilt control unit 108 controls the pan driving unit 106 and the tilt driving unit 107 on the basis of the instruction by the system control unit 103.

The communication unit 109 receives the various commands transmitted from the communication unit 204 of the client apparatus 200 via the network 300 and transmits the received commands to the system control unit 103. The communication unit 109 also transmits the image or the like to the communication unit 204 of the client apparatus 200 via the network 300 on the basis of the instruction by the system control unit 103.

The recording unit 110 is a non-volatile memory that holds the setting information related to the image analysis processing for realizing the camera function. The external input unit 111 is constituted by including a power button, various setting buttons, and the like, and the user can input various instructions to the camera 100 by operating the external input unit 111.

Next, the configuration of the client apparatus 200 and the functions of the respective units will be described.

The display unit 201 of the client apparatus 200 is constituted by including a monitor such as a liquid crystal display (LCD) and displays the image obtained from the camera 100 and a graphic user interface (GUI) for performing camera control. The input unit 202 is constituted by including a key board and a pointing device such as a mouse, and the user of the client apparatus 200 can input the various commands via the GUI by operating the input unit 202. According to the present embodiment, the user of the client apparatus 200 can specify the above-described specified area by operating the input unit 202 via the GUI.

The system control unit 203 performs display control for displaying the image received from the camera 100 via the communication unit 204 on the display unit 201. The system control unit 203 also generates various commands in accordance with the GUI operation by the user and outputs the generated commands to the communication unit 204 such that the commands are to be transmitted to the camera 100.

The communication unit 204 receives the image and signal transmitted from the communication unit 109 of the camera 100 via the network 300 and transmits the received information to the system control unit 203. The communication unit 204 also transmits the above-described commands to the communication unit 109 of the camera 100 via the network 300 on the basis of the instruction of the system control unit 203.

Hardware Configuration

Figure 3:
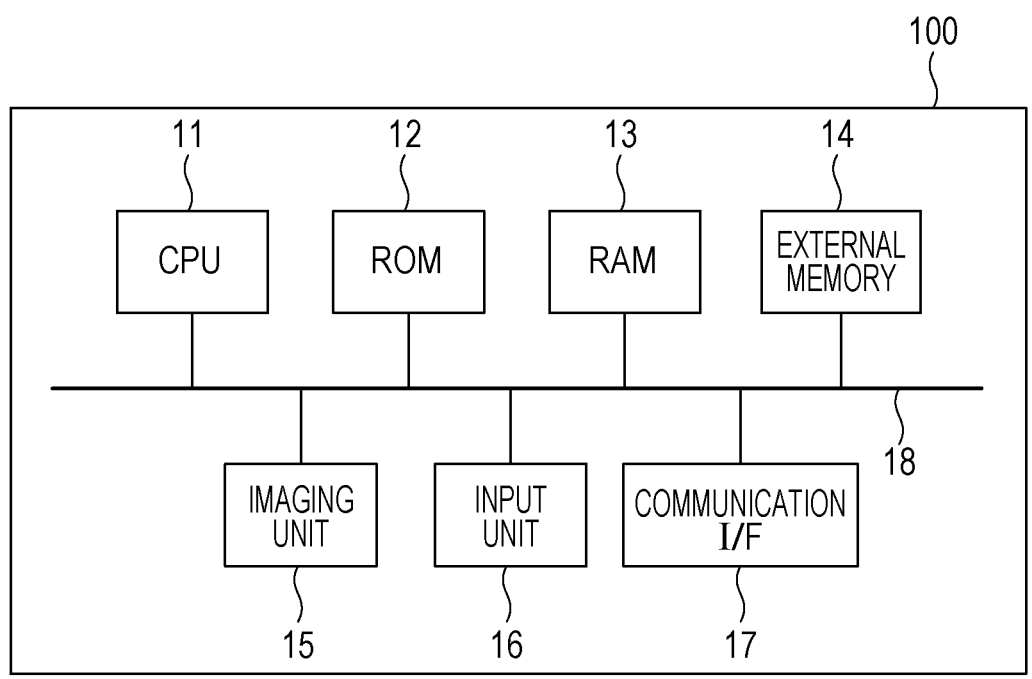
FIG. 3 illustrates a hardware configuration example of the network camera.

FIG. 3 illustrates a hardware configuration example of the camera 100.

As illustrated in FIG. 3, the camera 100 is provided with a CPU 11, a ROM 12, a RAM 13, an external memory 14, an imaging unit 15, an input unit 16, a communication I/F 17, and a system bus 18. The CPU 11 is configured to control the operation in the camera 100 in an overall manner and control the respective constituent units (12 to 17) via the system bus 18. The ROM 12 is a non-volatile memory that stores a control program or the like used for the CPU 11 to execute processing. It should be noted that the program may be stored in the external memory 14 or a detachably attachable storage medium (not illustrated). The RAM 13 functions as a main memory of the CPU 11, a work area, or the like. That is, the CPU 11 loads the used program or the like from the ROM 12 when the processing is executed onto the RAM 13 and executes the program or the like to realize the various function operations.

The external memory 14 stores various data, various information, or the like used for the CPU 11 to perform the processing using the program, for example. The external memory 14 also stores, for example, various data, various information, or the like obtained when the CPU 11 performs the processing using the program or the like. The imaging unit 15 corresponds to the imaging unit 101 of FIG. 2. The input unit 16 corresponds to the external input unit 111 of FIG. 2. The communication I/F 17 corresponds to the communication unit 109 of FIG. 2. A part or all of the functions of the respective elements of the camera 100 illustrated in FIG. 2 can be realized when the CPU 11 executes the program. It should be noted however that at least a part of the respective elements of the camera 100 illustrated in FIG. 2 may also be operated as dedicated-use hardware. In this case, the illustrated in FIG. 2 is operated on the basis of the control of the CPU 11.

It should be noted that, in the case of the client apparatus 200, the hardware configuration corresponding to the display unit 201 of FIG. 2 is provided instead of the imaging unit 15 of FIG. 3. Furthermore, in the case of the client apparatus 200, the hardware configuration corresponding to the input unit 202 of FIG. 2 is provided as the input unit 16, and the hardware configuration corresponding to the communication unit 204 of FIG. 2 is provided as the communication I/F 17. A part or all of the functions of the respective elements of the client apparatus 200 illustrated in FIG. 2 can be realized when a CPU of the client apparatus 200 corresponding to the CPU 11 executes the program. It should be noted however that at least a part of the respective elements of the client apparatus 200 illustrated in FIG. 2 may be operated as dedicated-use hardware. In this case, the dedicated-use hardware may be operated on the basis of the control by the CPU.

According to the present embodiment, the camera 100 obtains information related to the specified area that is specified on the image displayed on the display unit 201 of the client apparatus 200 by the user to set the function of the camera 100 and creates new setting information including information related to the obtained specified area. The camera 100 also compares the new setting information with the existing setting information saved in the recording unit 110 and determines whether or not the specified areas included in the respective pieces of the setting information are overlapped with each other. The camera 100 then decides processing to be executed with respect to at least one of the new setting information and the existing setting information in accordance with a determination result. Specifically, the camera 100 saves the new setting information in the recording unit 110 to be applied as the setting information used for the image analysis processing and deletes the existing setting information from the recording unit 110 to be excluded from the setting information used for the image analysis processing in accordance with the above-described determination result.

According to the present embodiment, a case will be described where the camera 100 functioning as the imaging apparatus operates as an information processing apparatus configured to create the setting information related to the image analysis processing and decide the processing at the time of the saving of the setting information. It should be noted however that the client apparatus 200 may operate as the above-described information processing apparatus, and a general PC, another device, or the like may also operate as the above-described information processing apparatus. According to a second embodiment and subsequent embodiments too, the client apparatus 200 may similarly operate as the information processing apparatus.

Figure 4:
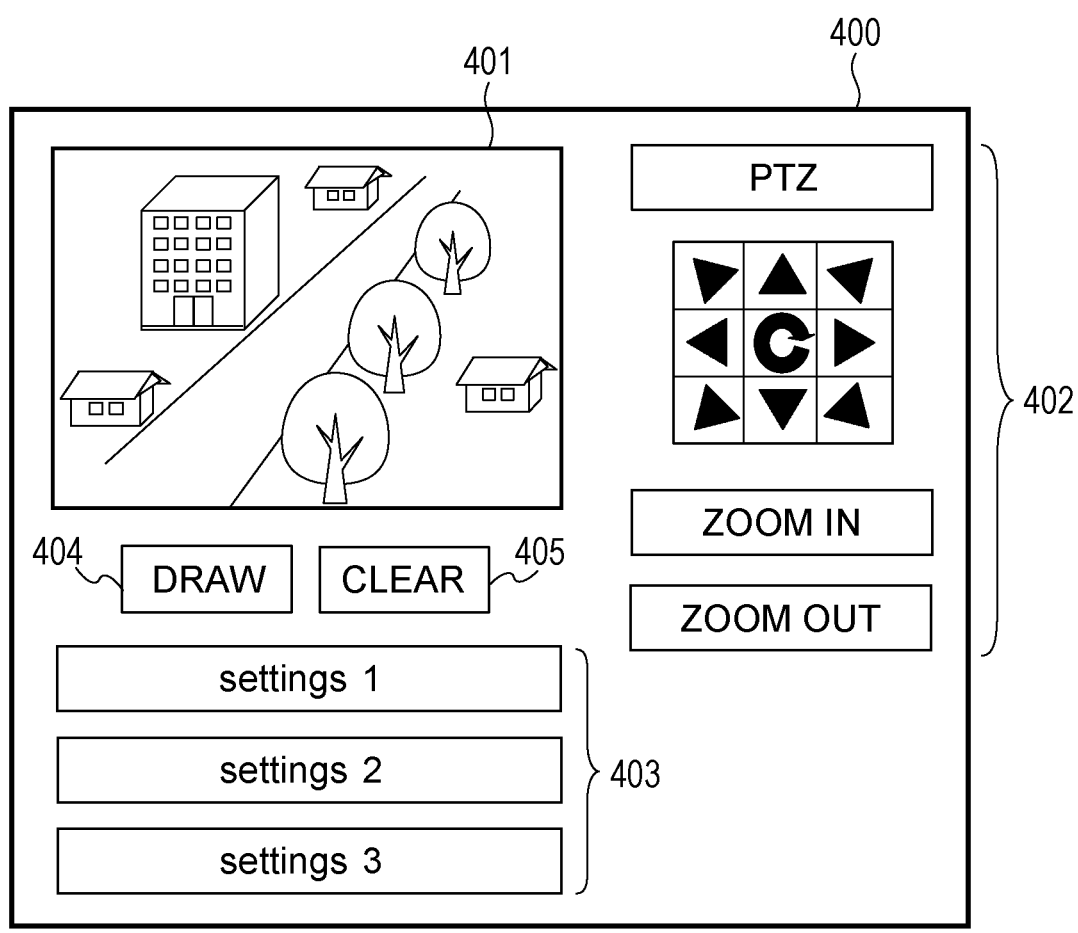
FIG. 4 illustrates an example of a function setting screen of the network camera.

FIG. 4 illustrates an example of a function setting screen 400 for setting the function of the camera 100 which is displayed on the display unit 201 of the client apparatus 200.

The function setting screen 400 is constituted by including an image display unit 401, a PTZ operation unit 402, and a setting creation unit 403. The image shot by the camera 100 is displayed on the image display unit 401. It should be noted that video currently shot by the camera 100 or previously recorded video is displayed on the image display unit 401. The PTZ operation unit 402 is constituted by a plurality of GUIs for performing the PTZ operation of the camera 100. The setting creation unit 403 is constituted by the GUI for selecting an arbitrary setting item for creating the setting information from among a plurality of setting items.

The user can specify an arbitrary area in a display area of the image display unit 401. The specification of the area can be realized by drawing a graphic form by using a mouse or the like, for example. In this case, for example, after a DRAW button 404 is selected, the user draws a graphic form in the display area of the image display unit 401 and selects an arbitrary setting item of the setting creation unit 403, so that it is possible to instruct to create setting information including information related to the specified area. After the graphic form is drawn in the display area of the image display unit 401, the user can also delete the drawn graphic form by selecting a CLEAR button 405.

Next, the operation of the camera 100 according to the present embodiment will be described. Herein, a case where the intrusion detection function of the camera 100 is set will be described as an example.

Figure 5:
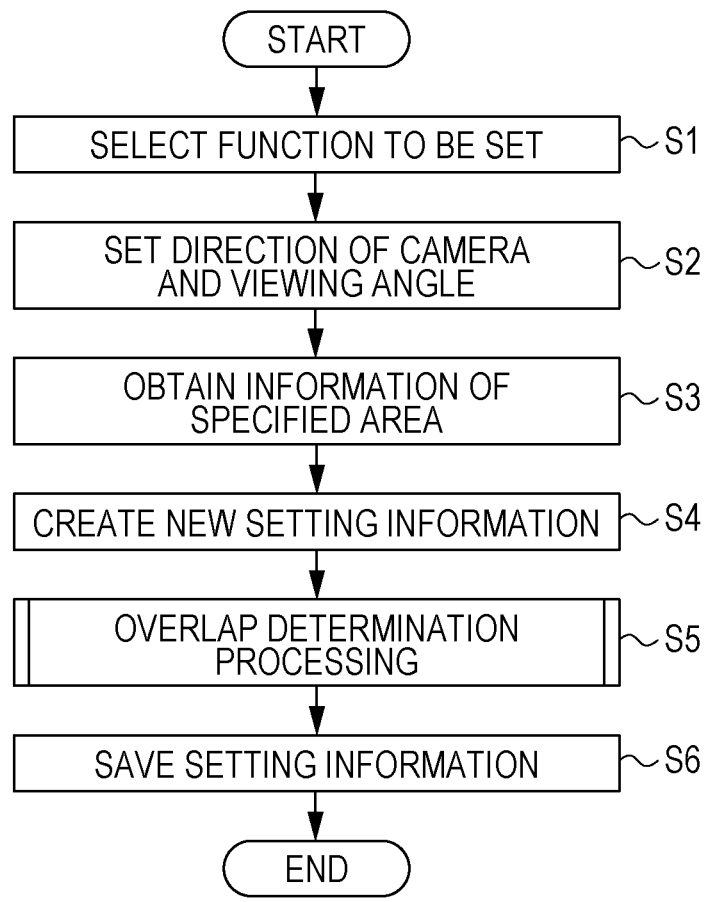
FIG. 5 is a flow chart illustrating a procedure of function setting processing of the network camera.

FIG. 5 is a flow chart illustrating a procedure of function setting processing executed by the camera 100. This processing of FIG. 5 is started at a timing when the user operates the setting screen displayed on the client apparatus 200 and instructs to start the creation of the setting information of the camera function. It should be noted however that the starting timing of the processing of FIG. 5 is not limited to the above-described timing.

The camera 100 can realize respective processes illustrated in FIG. 5 by reading out the program used by the CPU 11 to be executed. It should be noted however that the processing of FIG. 5 may also be realized when at least part of the respective elements of the camera 100 illustrated in FIG. 2 is operated as dedicated-use hardware. In this case, the dedicated-use hardware operates on the basis of the control of the CPU 11. Hereinafter, an alphabet S means a step in the flow chart.

First, in S1, the system control unit 103 obtains a camera function corresponding to a creation target of the setting information specified by the user via the communication unit 109. Herein, the user can select the desired camera function by the operation with respect to the function setting screen 400 or the operation before the function setting screen 400 is displayed on the client apparatus 200.

Next, in S2, the system control unit 103 obtains information of the pan/tilt function and the zoom function of the PTZ operation unit 402 operated while checking the image displayed on the image display unit 401 in the function setting screen 400 by the user via the communication unit 109. The system control unit 103 then performs the instruction of the pan/tilt operation with respect to the pan/tilt control unit 108 and the instruction of the zoom operation with respect to the lens control unit 105 on the basis of the obtained information. With this configuration, the imaging direction and the viewing angle of the camera 100 are changed.

In S3, the system control unit 103 obtains information related to a range of the specified area that is specified in the display area of the image display unit 401 by the user by operating the pointing device such as the mouse via the communication unit 109. This specified area is an area for detecting an object (for example, a person) intruding into the area as a monitoring target. In S4, when the system control unit 103 confirms that the user has selected an arbitrary setting item of the setting creation unit 403 in the function setting screen 400 via the communication unit 109, the system control unit 103 creates new setting information on the basis of the information of the specified area obtained in S3 and temporarily saves the new setting information.

In S5, the system control unit 103 determines the presence or absence of an overlap of the specified area included in the setting information previously created by the user and saved in the recording unit 110 and the specified area included in the new setting information and executes processing in accordance with the determination result. A detail of this overlap determination processing in S5 will be described below. In S6, the system control unit 103 saves the setting information created in S4 in the recording unit 110 corresponding to the non-volatile memory in accordance with the processing in S5.

Figure 6:
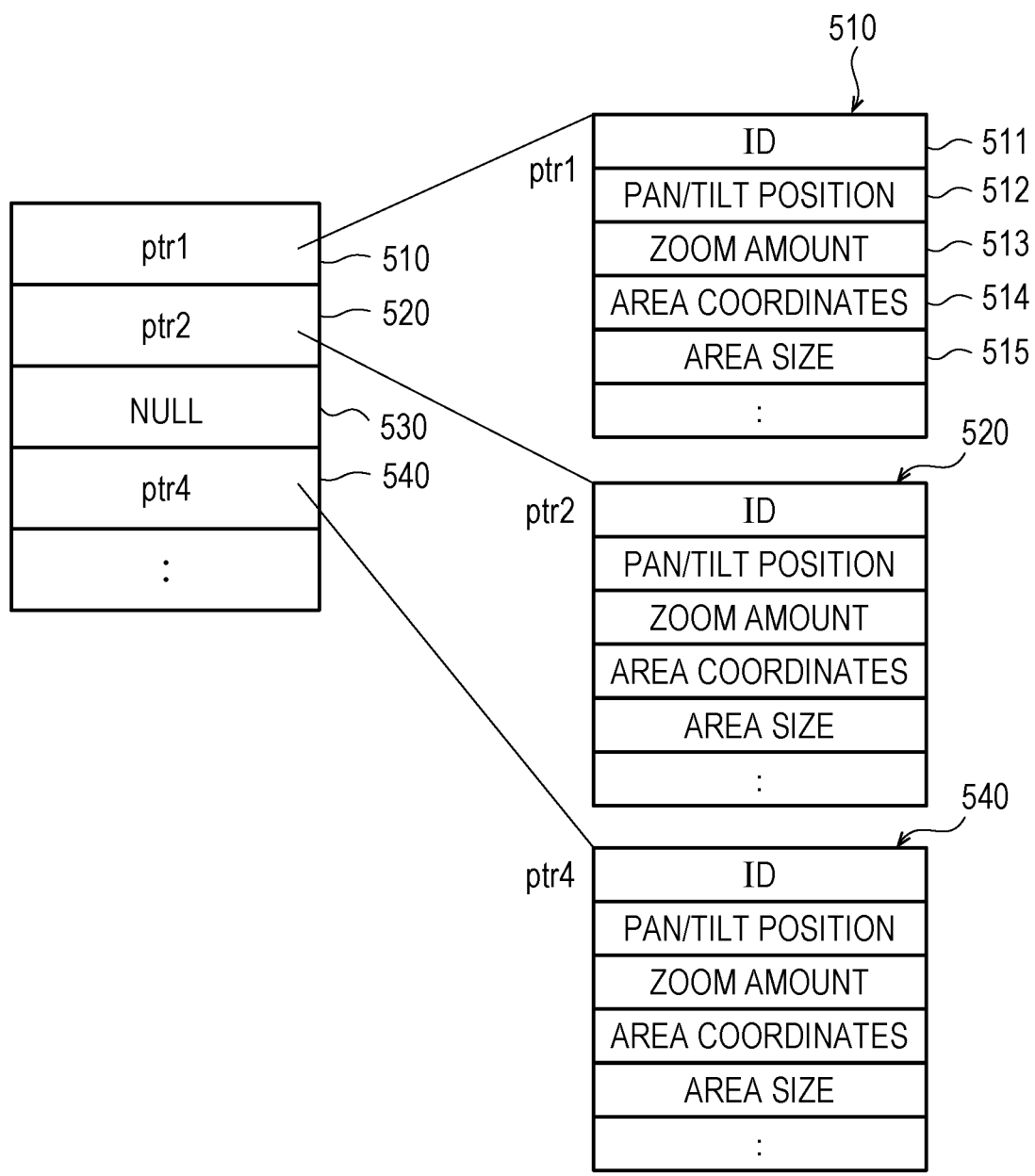
FIG. 6 illustrates an example of a data structure of setting information of the network camera.

FIG. 6 illustrates an example of a data structure of setting information saved in the recording unit 110. According to the present embodiment, plural pieces of setting information 510, 520, 530, 540, . . . can be saved in the recording unit 110. Herein, an ID 511 included in the setting information 510 is identification information for identifying the setting information. Pan/tilt information 512 indicates the pan/tilt position of the camera 100 at a time when this setting information is created, and zoom information 513 indicates a zoom amount of the camera 100 at a time when this setting information is created. Furthermore, area coordinates 514 correspond to information indicating a position of the specified area on the image, and an area size 515 corresponds to information indicating a size of the specified area on the image. In this manner, the setting information includes the information indicating the position and the size of the specified area as the information related to the specified area.

Figure 7:
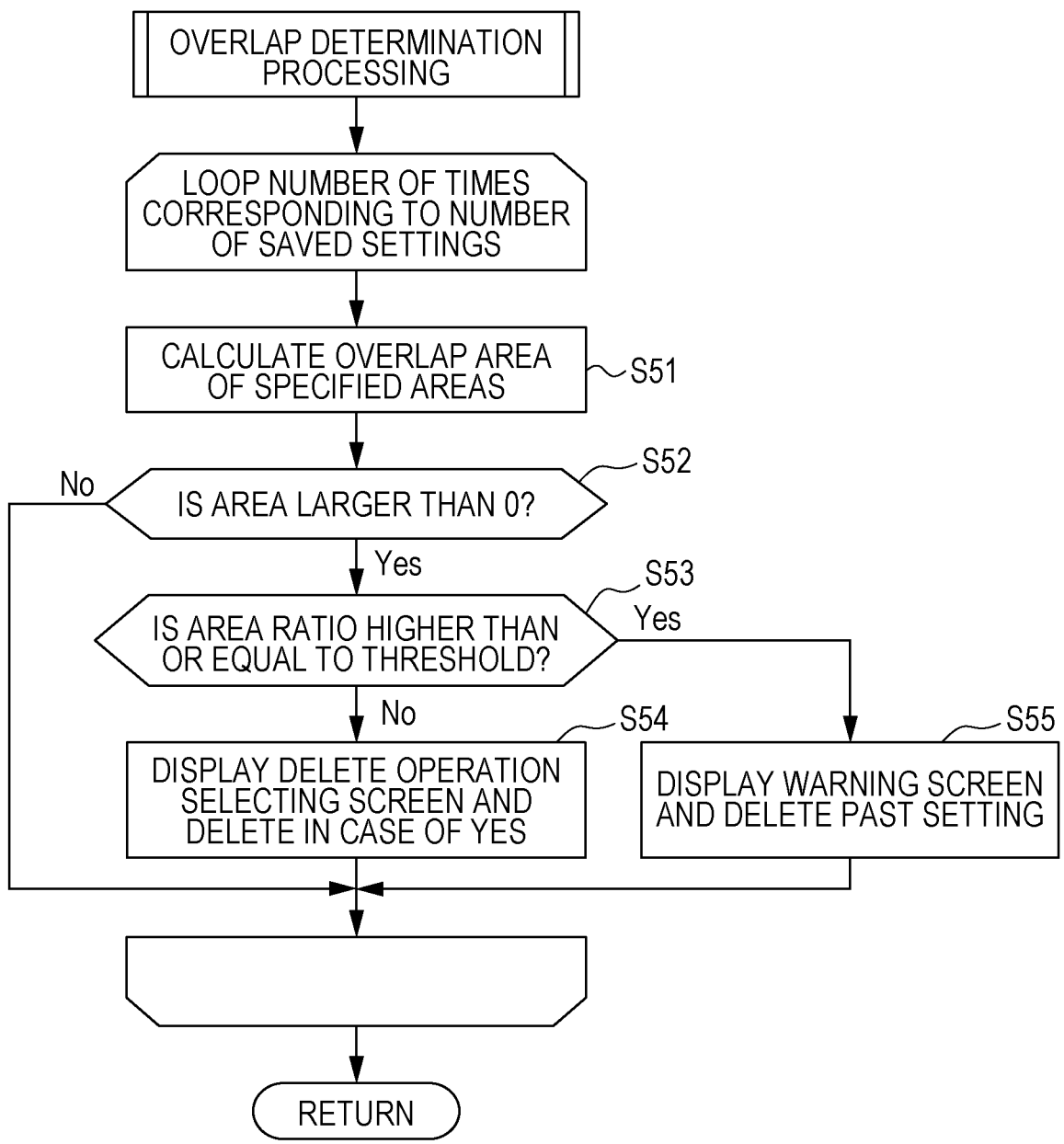
FIG. 7 is a flow chart illustrating a procedure of overlap determination processing.

FIG. 7 is a flow chart illustrating a procedure of the overlap determination processing executed in S5 in FIG. 5. In this overlap determination processing, first, the system control unit 103 reads out the setting information related to the image analysis processing having the same type as the setting information created in S4 among the setting information previously set and saved in the recording unit 110. The system control unit 103 then repeats the processing in S51 to S55 the number of times corresponding to the number of read setting information.

In S51, the system control unit 103 calculates the area of an overlapped area of the specified area included in the previous setting information and the specified area included in the new setting information. Specifically, the system control unit 103 first calculates the imaging direction and the viewing angle of the camera 100 on the basis of the pan/tilt information and the zoom information included in the previous setting information to be compared with the current imaging direction and the current viewing angle of the camera 100 and determines whether or not the imaging areas are overlapped with each other. At this time, when the imaging areas are not overlapped with each other, the system control unit 103 sets the area of the overlapped area of the specified areas as 0.

On the other hand, in a case where the imaging areas are overlapped with each other, the system control unit 103 determines the presence or absence of the overlapped area of the specified areas on the basis of the position and the size of the specified area included in the previous setting information and the position and the size of the specified area included in the new setting information. At this time, the system control unit 103 determines the presence or absence of the overlapped area of the specified areas by using the coordinates of both positions and the viewing angles in combination. In a case where the specified areas are overlapped with each other, the area of the overlapped area of the specified areas is calculated. An area ratio (%) is calculated as the ratio (%) of the specified area included in the new setting information which is included in the overlapped area.

In S52, the system control unit 103 determines whether or not the area of the overlapped area which is calculated in S51 is larger than 0. In a case where it is determined that the area of the overlapped area is 0, the system control unit 103 shifts to the processing with respect to the next setting information. In a case where it is determined that the area of the overlapped area is larger than 0, the system control unit 103 determines that the overlap of the specified areas exists and shifts to S53.

In S53, the system control unit 103 determines whether or not the area ratio calculated in S51 is higher than or equal to a previously set predetermined threshold. In a case where it is determined that the area ratio is lower than the threshold, the system control unit 103 shifts to S54. In a case where it is determined that the area ratio is higher than or equal to the threshold, the system control unit 103 shifts to S55.

Figure 8:
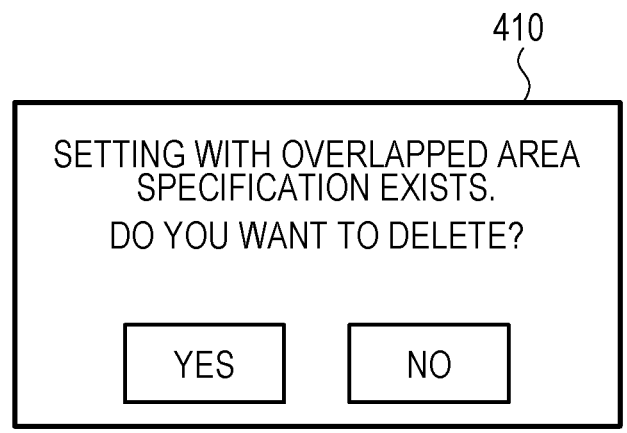
FIG. 8 illustrates an example of a delete operation selecting screen.

In S54, the system control unit 103 performs processing for urging the user to select whether or not the previous setting information is to be deleted. Herein, the system control unit 103 performs display control for displaying, for example, a delete operation selecting screen 410 illustrated in FIG. 8 on the display unit 201 of the client apparatus 200 and urges the user to select whether or not the previous setting information is to be deleted. The system control unit 103 then obtains the selection result of the user with respect to the delete operation selecting screen 410 and executes the processing in accordance with the obtained selection result.

That is, in a case where the user selects a "YES" button on the delete operation selecting screen 410, the system control unit 103 deletes the previous setting information from the recording unit 110. For example, in a case where the specified area that is specified by the user on the function setting screen 400 and the specified area included in the previous setting information 530 in FIG. 6 are overlapped with each other and it is determined in S54 or S55 that the previous setting information is to be deleted, the setting information 530 is deleted. In this case, as illustrated in FIG. 6, the setting information 530 becomes "NULL". With this configuration, the setting information 530 is excluded from the setting information used for the image analysis processing.

On the other hand, in a case where the user selects a "NO" button on the delete operation selecting screen 410, the system control unit 103 does not delete the previous setting information from the recording unit 110, and the previous setting information remains. That is, in this case, the application of the previous setting information recorded in the recording unit 110 remains as the setting information used for the image analysis processing.

Figure 9:
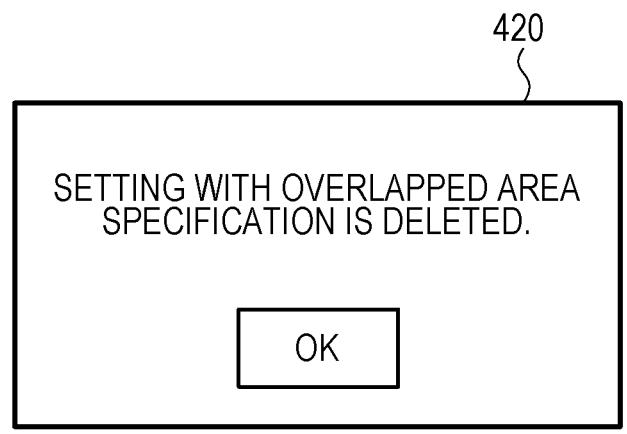
FIG. 9 illustrates an example of a warning screen.

In S55, the system control unit 103 deletes the previous setting information from the recording unit 110 and notifies the user that the previous setting information has been deleted. At this time, the system control unit 103 performs display control for displaying, for example, a warning screen 420 illustrated in FIG. 9 on the display unit 201 of the client apparatus 200. When the system control unit 103 executes the processing in S51 to S55 in sequence with respect to all the setting information of the same type, the processing in FIG. 7 is ended.

As described above, the camera 100 according to the present embodiment obtains the new setting information created by the user operation and the previous setting information recorded in the recording unit 110 corresponding to the setting information related to the image analysis processing of the same type as the new setting information. The camera 100 performs display control for displaying the shot image on the display unit of the client apparatus 200 and accepts a specification of an area on the image displayed on the display unit, so that the new setting information can be created. The camera 100 then determines the presence or absence of the overlapped area where the specified area included in the new setting information and the specified area included in the previous setting information are overlapped with each other and decides processing to be executed with respect to at least one of the new setting information and the previous setting information in accordance with the determination result.

Specifically, the camera 100 determines the presence or absence of the overlapped area and calculates, in a case where it is determined that the overlapped area exists, the area ratio representing the overlap amount of the overlapped area to determine whether or not the calculated area ratio is higher than or equal to the predetermined threshold. Herein, this area ratio is the area ratio of the specified area included in the new setting information which is included in the overlapped area. In a case where it is determined that the overlapped area does not exist, the camera 100 determines that the new setting information and the previous setting information may be respectively applied as the setting information used for the image analysis processing and records the new setting information created by the user operation in the recording unit 110.

On the other hand, in a case where it is determined that the overlapped area exists and also the area ratio of the overlapped area is higher than or equal to the threshold, the camera 100 determines that the operation that is not desired by the user by the overlapped area may frequently occur and automatically excludes the previous setting information from the setting information used for the image analysis processing. That is, the previous setting information is automatically deleted from the recording unit 110. In a case where it is determined that the area ratio of the overlapped area is lower than the threshold, the camera 100 determines that the operation that is not desired by the user may occur to some extent due to the overlapped area and urges the user to select whether or not the previous setting information is to be excluded from the setting information used for the image analysis processing.

Herein, the above-described image analysis processing can be set as the intrusion detection processing, for example. In a case where plural pieces of setting information regarding to the intrusion detection processing are set and the overlapped area exists in the specified areas included in the respective pieces of the setting information, the notification of the intrusion detection event occurs plural times in the overlapped area. The notification of the intrusion detection event may occur outside the specified area included in the new setting information due to the influence of the specified area included in the previous setting information.

Therefore, in a case where the image analysis processing is the intrusion detection processing and the overlapped area exists in the specified area, the camera 100 deletes the previous setting information from the recording unit 110 and excludes the previous setting information from the setting information used for the image analysis processing. With this configuration, the new setting information can be created without keeping the unwanted setting information, and it is possible to suppress the occurrence of the operation that is not desired by the user.

In addition, as described above, in a case where the area ratio of the overlapped area is lower than the threshold, the camera 100 can urge the user to select whether or not the previous setting information is to be deleted. In a case where the overlap amount of the overlapped area is low, the overlap of the areas can be permitted in some cases depending on the user since the number of the undesired event notifications is decreased. When the user can select whether or not the previous setting information is to be deleted, the user can more appropriately obtain the desired result.

It should be noted that, according to the present embodiment, the case has been described where the user is urged to select whether or not the previous setting information is to be deleted in S54 in a case where the area ratio of the overlapped area is lower than the threshold. However, the user may be urged to select whether or not the new setting information is to be deleted, that is, whether or not the new setting information is to be recorded in the recording unit 110. The user may also be urged to select which one of the previous setting information and the new setting information is to be deleted.

In recent years, various new functions have been mounted to the network camera, and setting items are prepared for each of the functions. With regard to these respective functions, it is possible to save plural pieces of setting information including the information related to the specified area. In addition, some of cameras that can transmit a plurality of streams can save the above-described setting information for each stream. In this manner, a large number of pieces of setting information including the area specification are being saved inside the network camera. Then, it becomes difficult for the user to remember the position and the size of the specified area that has been previously set and saved.

In addition, in the camera including the PTZ mechanism, the user decides the direction and the viewing angle for the imaging by the camera, and the user can specify the area on the shot image displayed on the screen. However, in this case, when the imaging direction and the viewing angle which are previously set and the imaging direction and the viewing angle of the image currently displayed on the screen are different from each other, it is difficult for the user to specify the area while checking the position and the size of the previously specified area.

Therefore, in a case where the plurality of specified areas are set with regard to the function settings of the same type, the area tends to be specified in the overlapped position. When the plural pieces of setting information are used while the area is specified in the overlapped position, a phenomenon may occur where the result desired by the user is not obtained in the network camera function.

In contrast to this, according to the present embodiment, the overlap of the specified areas included in the setting information of the same type is determined, and the processing in accordance with the determination result is decided. For this reason, even in a case where the user unintendedly sets the overlapped specified area, the new setting information can be created without keeping the unwanted setting information. Therefore, according to the present embodiment, it is possible to appropriately create the setting information including the area specification without impairing the operation desired by the user in the function setting of the network camera. In addition, the user does not need to remember the specified area that has been previously set by itself, and load of the user is also alleviated.

It should be noted that, according to the present embodiment, the setting information may include time information indicating a time when this setting information is created. In this case, in a case where plural pieces of setting information in which the specified areas are overlapped with each other among the setting information of the same type as the new setting information, in S54 or S55, an order of the setting information to be set as a deletion processing target may be decided on the basis of the above-described time information. For example, the setting information having the old time may be deleted first in the deletion processing of the setting information. With this configuration, it becomes possible for the user to appropriately obtain a result desired at the current time.

In addition, according to the present embodiment, in a case where piece of setting information where the specified areas are overlapped with each other exist, the determination result of the overlapped area may be displayed on the image displayed on the image display unit 401 of the function setting screen 400. For example, the overlapped area may be superimposed on the image displayed on the image display unit 401 by graphics to be drawn. At this time, the area ratio of the overlapped area may also be displayed on the function setting screen 400. At the time of the display of the overlapped area, the viewing angle may be adjusted when necessary, and the specified area included in the previous setting information and the specified area included in the new setting information may be contained in the screen. With this configuration, the user appropriately grasps the overlap state of the specified areas and can determine whether or not the previous setting information is to be deleted.

Second Embodiment

Next, a second embodiment of the present invention will be described.

According to the above-described first embodiment, the case has been described where the setting of the intrusion detection function is performed. According to the second embodiment, a case where setting of the communication data amount reduction function based on the ROI specification is performed will be described. Herein, the communication data amount reduction function based on the ROI specification is a function for reducing the communication data amount by decreasing a quality level of an image in an area outside the specified area and compressing and transmitting image data efficiently. When an arbitrary value is added to a Q value of the area outside the specified area, it is possible to change the quality level of the image. The Q value is numeric value information representing the quantization amount at the time of the image compression. When the Q value is increased, a compression rate is increased, and the image quality is decreased.

First, a setting example of the communication data amount reduction function based on the ROI specification will be described with reference to FIGS. 10A and 10B.

Figure 10A:
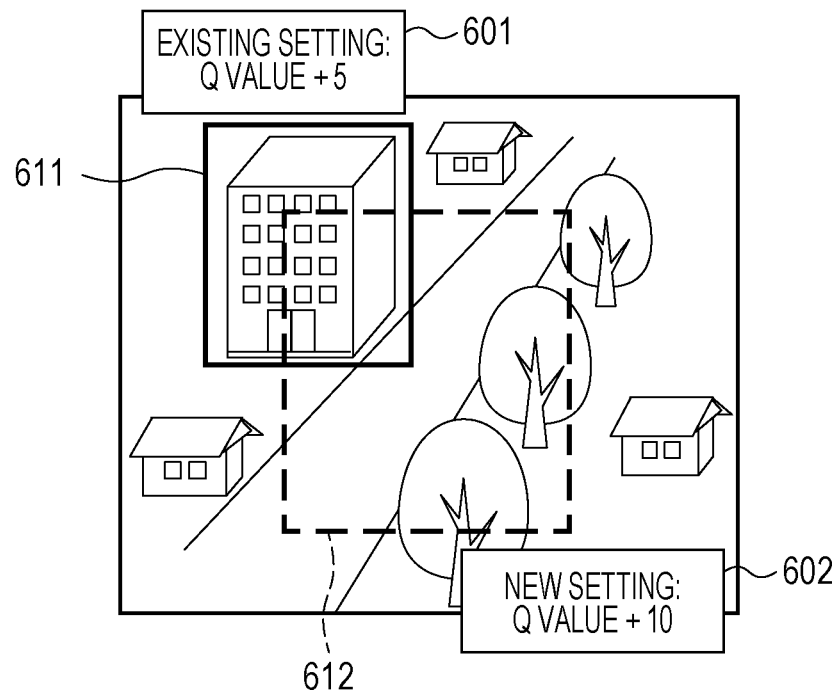
FIGS. 10A and 10B illustrate examples of Q value specification of a communication data amount reduction function based on ROI.

FIG. 10A illustrates an example in which, in a case where a setting 601 for adding 5 to the Q value outside the specified area 611 exists, a setting 602 for adding 10 to the Q value outside the specified area 612 is newly specified. In this case, when the existing setting 601 is deleted and the new setting 602 is adopted, processing is operated such that the communication data amount is decreased as compared with that before the setting.

Figure 10B:
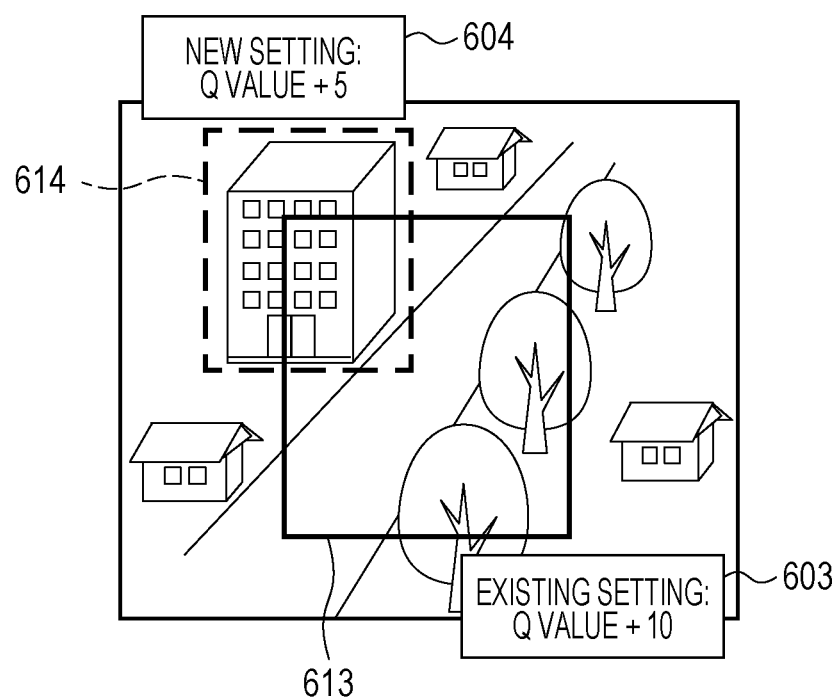

On the other hand, FIG. 10B illustrates an example in which, in a case where a setting 603 for adding 10 to the Q value outside the specified area 613 exists, a setting 604 for adding 5 to the Q value outside the specified area 614 is newly specified. In this case, when the existing setting 603 is deleted and a new setting 604 is adopted, processing is operated such that the communication data amount is increased as compared with that before the setting. As a disadvantage from the increase in the communication data amount, it is expected that a transmittable band is unnecessarily consumed and the data recording capacity is increased, for example.

That is, in a case where the overlap of the specified areas exists and the area ratio of the overlapped area is higher than or equal to the threshold, when the previous setting information is deleted and the new setting information is adopted, there is a fear that the communication data amount is increased and the user does not obtain the desired result depending on the contents of the new setting information.

In view of the above, according to the present embodiment, in a case where the camera function corresponding to the setting target is the communication data amount reduction function based on the ROI specification, the processing to be executed next is decided by taking into account the contents of the new setting information.

The flow of the function setting processing executed by the camera 100 according to the present embodiment is similar to that of FIG. 5. It should be noted however that the procedure of the overlapped area determination processing in S5 differs.

Figure 11:
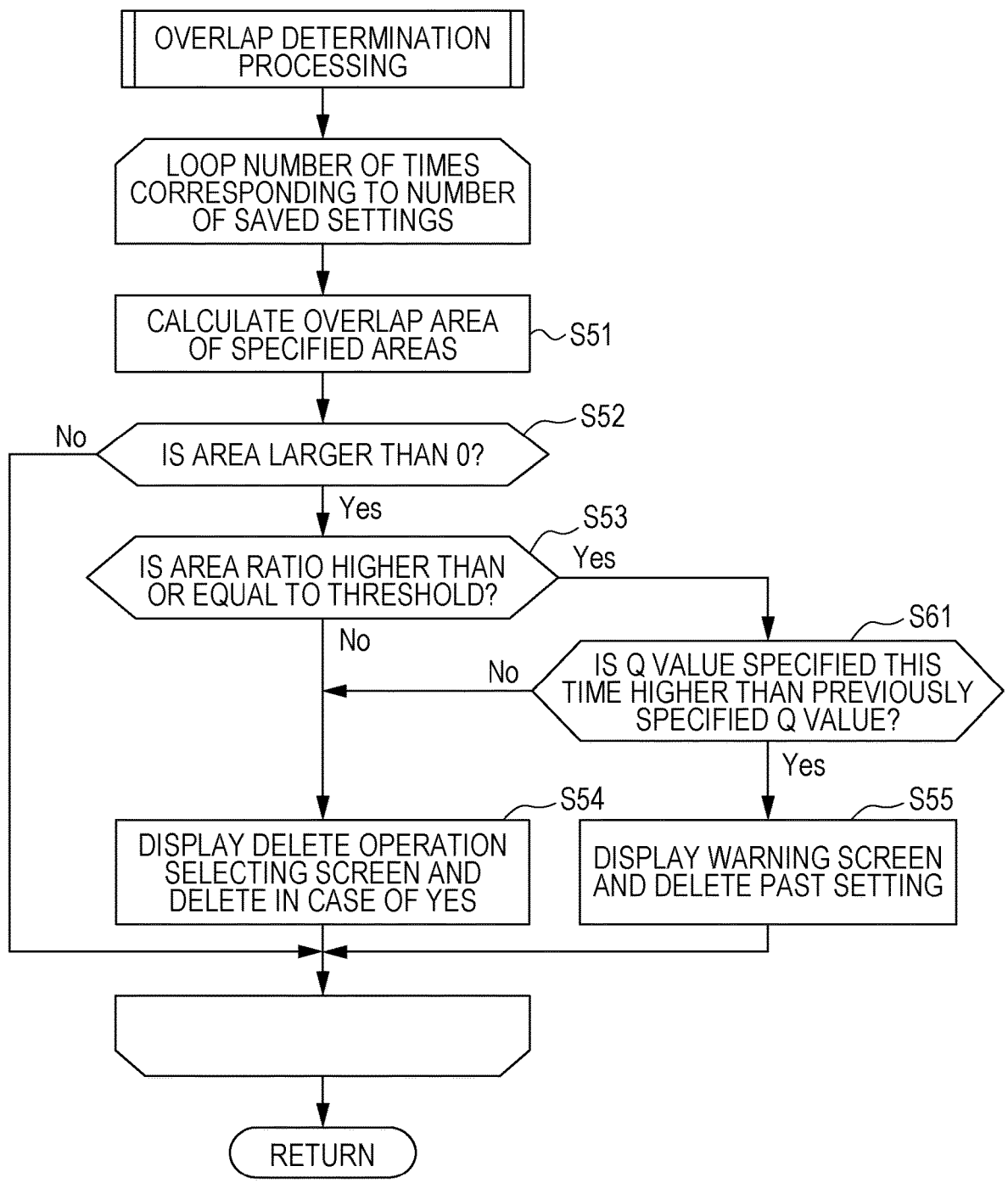
FIG. 11 is a flow chart illustrating a procedure of the overlap determination processing according to a second embodiment.

FIG. 11 is a flow chart illustrating a procedure of the overlapped area determination processing executed by the camera 100 in S5 in FIG. 5. This processing in FIG. 11 is similar to the processing in FIG. 7 except that the processing in S61 is added. Therefore, the part that executes the same processing as that in FIG. 7 is assigned with the same step number as that in FIG. 7, and a part where the processing is different will be mainly described below.

In a case where it is determined in S53 that the area ratio of the overlapped area is higher than or equal to the threshold, the system control unit 103 shifts to S61 and determines whether or not the Q value specified when the user specifies the area this time is higher than the previously specified Q value. Specifically, the system control unit 103 determines a magnitude relationship between the Q value included in the previous setting information which is read out from the recording unit 110 and the Q value included in the new setting information.

As described above, as the Q value is higher, the data amount reduction effect is higher. Therefore, in a case where it is determined that the Q value included in the new setting information is higher, the system control unit 103 shifts to S55 and executes the processing for deleting the previous setting information. The warning screen 420 (FIG. 9) for notifying that the setting information has been deleted is presented to the user. On the other hand, in a case where it is determined that the Q value included in the new setting information is lower, the system control unit 103 shifts to S54 and presents the delete operation selecting screen 410 (FIG. 8) for urging the user to select whether or not the previous setting information is to be deleted.

As described above, in a case where the user sets a plurality of the communication data amount reduction functions based on the ROI, when it is determined that the specified areas are overlapped each other, the camera 100 according to the present embodiment determines the magnitude relationship between the Q value included in the new setting information and the Q value included in the previous setting information. Then, the processing to be executed is decided in accordance with the determination result. Specifically, in a case where it is determined that the Q value included in the new setting information is higher than the Q value included in the previous setting information, the camera 100 deletes the previous setting information from the recording unit 110. With this configuration, it becomes possible to create the new setting information without impairing the reduction effect of the communication data amount.

It should be noted that, according to the present embodiment, in S54, the case has been described where the user is urged to select whether or not the previous setting information is to be deleted. However, the user may be urged to select whether or not the new setting information is to be deleted, that is, whether or not the new setting information is to be recorded in the recording unit 110. The user may also be urged to select which one of the previous setting information and the new setting information is to be deleted.

Third Embodiment

Next, a third embodiment of the present invention will be described.

According to the above-described first embodiment, the case has been described where the intrusion detection function is set. According to the third embodiment, a case where various video contents analysis (VCA) functions are mounted to the camera 100 will be described.

Along with an improvement in image processing performance, various VCA functions using a result of an image analysis inside the camera have been mounted to the network camera of recent years. Representative functions include moving object detection, intrusion detection, head count, and the like. When these VCA functions are set, a method of specifying the area like the above-described first embodiment is used.

Functions in which a desired result is not obtained when a plurality of areas are specified to overlapped with each other in the function settings of the same type and functions in which the overlap of the areas is permitted exist among the above-described types of the VCA functions. For example, in the case of a function of counting the number of people in the image (head count function), since the count is incremented multiple times in a part where the areas are overlapped with each other, the correct head count is not measured. That is, the head count function does not permit the overlap of the areas. In contrast to this, with regard to the VCA function such as the moving object detection, the notification of the event occurs multiple times due to the overlap of the areas in some cases, but a critical phenomenon such as erroneous detection does not occur. Therefore, the overlap of the areas may be permitted in some cases depending on the user.

In view of the above, according to the present embodiment, the processing to be executed next is decided by taking into account the type of the VCA function corresponding to the setting target.

The flow of the function setting processing executed by the camera 100 according to the present embodiment is similar to that of FIG. 5. It should be noted however that the procedure of the overlapped area determination processing in S5 differs.

Figure 12:
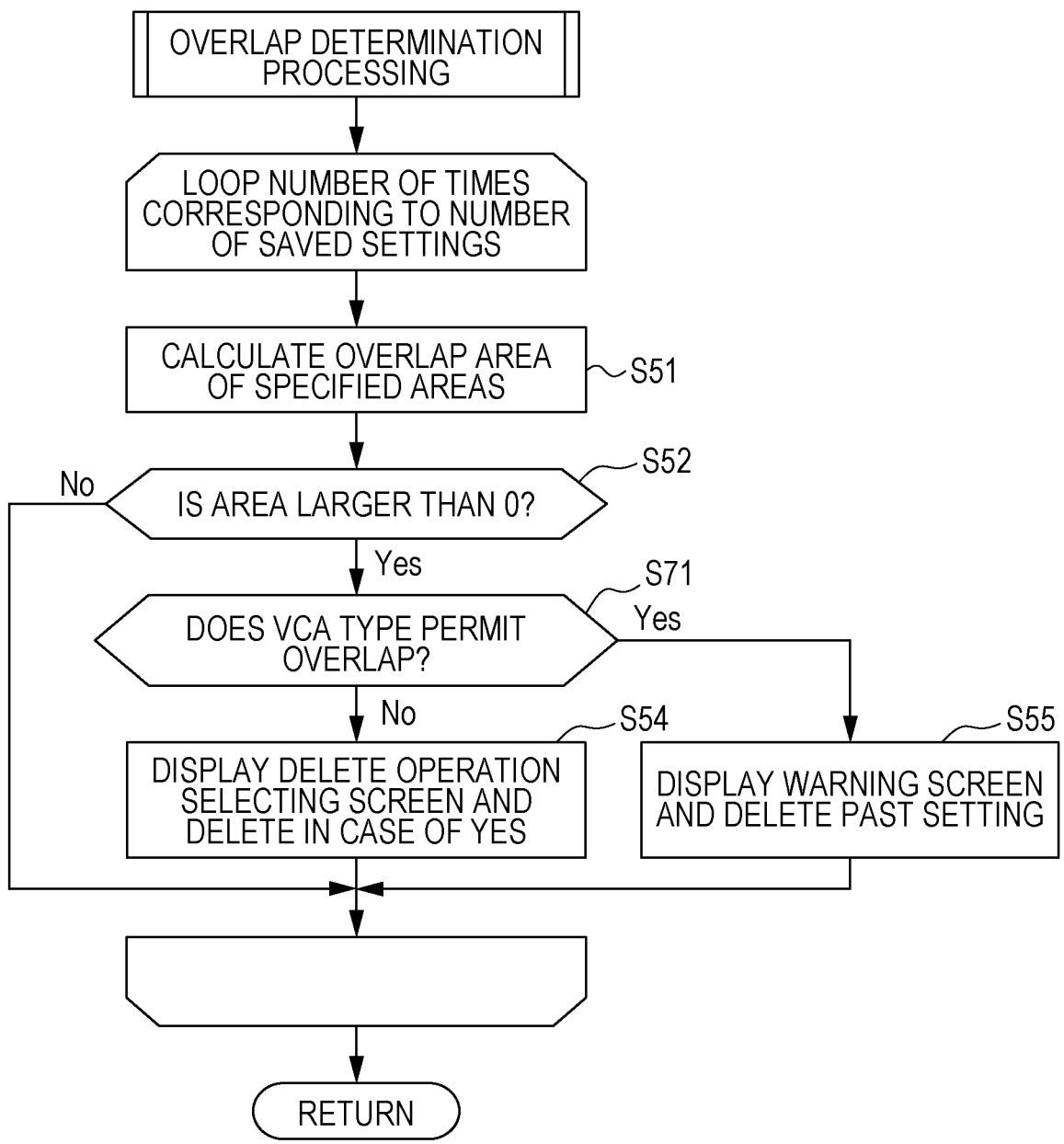
FIG. 12 is a flow chart illustrating a procedure of the overlap determination processing according to a third embodiment.

FIG. 12 is a flow chart illustrating a procedure of the overlapped area determination processing executed by the camera 100 in S5 in FIG. 5. This processing in FIG. 12 is similar to the processing in FIG. 7 except that the processing in S53 is deleted and the processing in S71 is added. Therefore, the part that executes the same processing as that in FIG. 7 is assigned with the same step number as that in FIG. 7, and a part where the processing is different will be mainly described below.

The system control unit 103 determines that the overlap of the areas exists in a case where it is determined in S52 that the area of the overlapped area is larger than 0 and shifts to S71. The system control unit 103 determines whether or not the type of the VCA function selected by the user is the type with which the overlap of the areas is permitted. Herein, the type with which the overlap of the areas is permitted includes the moving object detection. On the other hand, the type with which the overlap of the areas is not permitted includes the head count and the intrusion detection. It should be noted that a configuration may also be adopted in which the user can set whether or not each of the respective VCA functions is the type with which the overlap of the areas is permitted.

In a case where it is determined S71 that the type of the VCA function is a type with which the overlap of the areas is permitted, the system control unit 103 shifts to S54 and presents the delete operation selecting screen 410 (FIG. 8) for urging the user to select whether or not the previous setting information is to be deleted to the user. On the other hand, in a case where it is determined that the type of the VCA function is the type with which the overlap of the areas is not permitted, the system control unit 103 shifts to S55 and executes the processing for deleting the previous setting information. The system control unit 103 presents the warning screen 420 (FIG. 7) for notifying the user that the setting information has been deleted.

It should be noted that, in a case where the type of the VCA function is determined as the type with which the overlap of the areas is permitted, a configuration may be adopted in which the delete operation selecting screen 410 described above is not presented to the user, and the previous setting information regularly remains.

As described above, in a case where the user sets a plurality of the same VCA functions, when it is determined that the specified areas are overlapped with each other, the camera 100 according to the present embodiment determines the type of the VCA function, that is, the type of the image analysis processing in which the new setting information is used. Then, the processing to be executed is decided depending on whether or not the type of the VCA function is the type with which the overlap of the areas between the setting information is permitted. With this configuration, in the case of the VCA function in which the overlap of the areas between the setting information is not permitted, it is possible to delete the previous setting information and appropriately create the new setting information. It should be noted that, according to the present embodiment, the case has been described where, when the overlapped area exists in the specified area and also the type of the VCA function is the type in which the overlap of the areas between the setting information is permitted, the processing for urging the user to select whether or not the previous setting information is to be deleted. However, the processing for urging the user to select whether or not the new setting information is to be deleted, that is, whether or not the new setting information is to be recorded in the recording unit 110 may be performed. The user may also be urged to select which one of the previous setting information and the new setting information is to be deleted.

Fourth Embodiment

Next, a fourth embodiment of the present invention will be described.

According to the fourth embodiment, a case where an operation flag for switching valid/invalid statuses is prepared for each setting information to improve convenience of the function setting will be described. With this operation flag, the user can invalidate the camera function without deleting the setting information. The user can also operate the camera function again by simply validating the operation flag.

The flow of the function setting processing executed by the camera 100 according to the present embodiment is similar to that of FIG. 5. It should be noted however that the procedure of the overlapped area determination processing in S5 differs.

Figure 13:
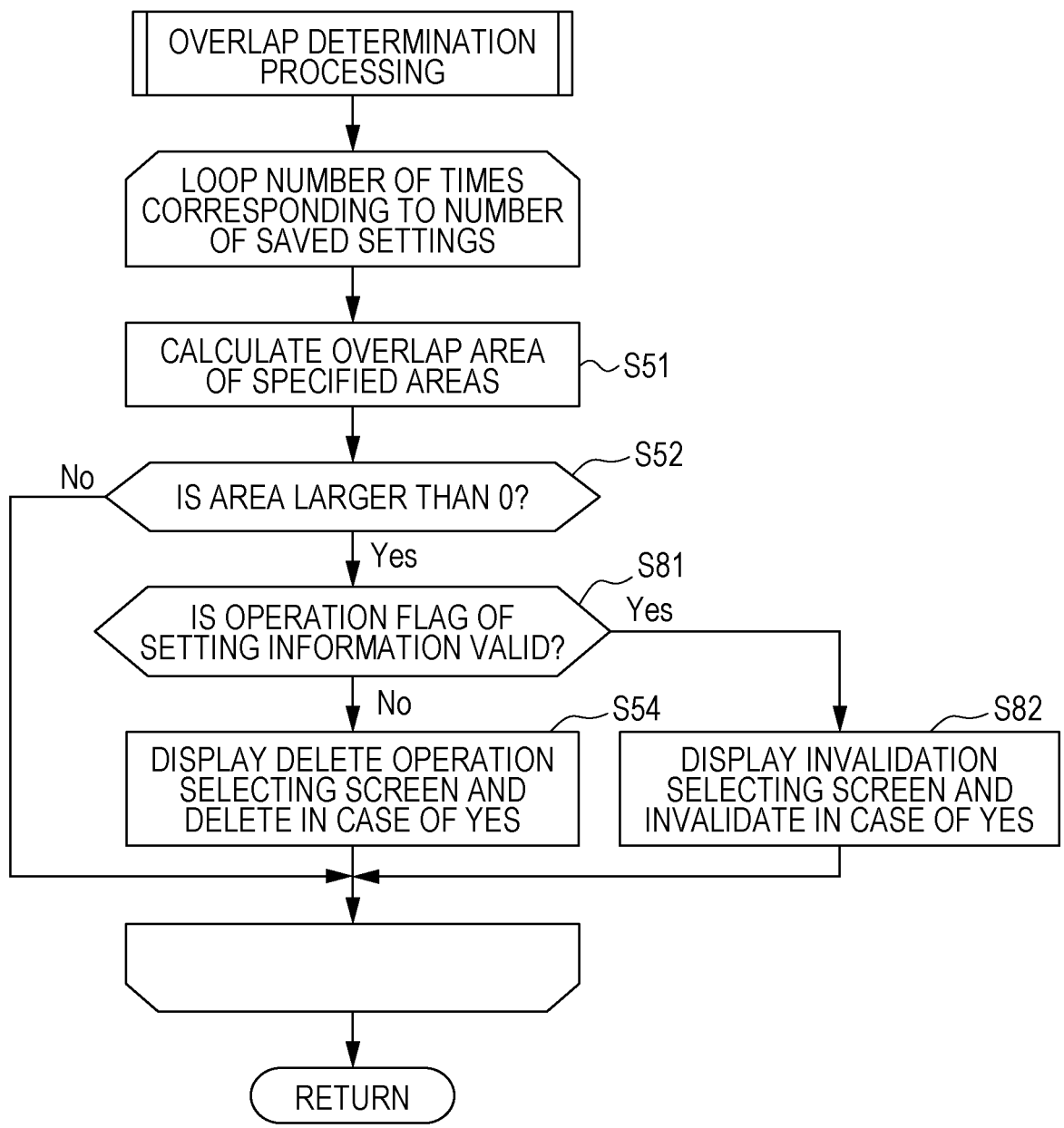
FIG. 13 is a flow chart illustrating a procedure of the overlap determination processing according to a fourth embodiment.

FIG. 13 is a flow chart illustrating a procedure of the overlapped area determination processing executed by the camera 100 in S5 in FIG. 5. This processing in FIG. 13 is similar to the processing in FIG. 7 except that the processing in S53 and the processing in S55 are deleted, and the processing in S81 and the processing in S82 are added. Therefore, the part that executes the same processing as that in FIG. 7 is assigned with the same step number as that in FIG. 7, and a part where the processing is different will be mainly described below.

The system control unit 103 determines that the overlap of the areas exists in a case where it is determined in S52 that the area of the overlapped area is larger than 0 and shifts to S81 to check the flag information included in the previous setting information. In a case where it is determined that the operation flag of the previous setting information is valid, the system control unit 103 shifts to S82. In a case where it is determined that the operation flag of the previous setting information is invalid, the system control unit 103 shifts to S54.

Figure 14:
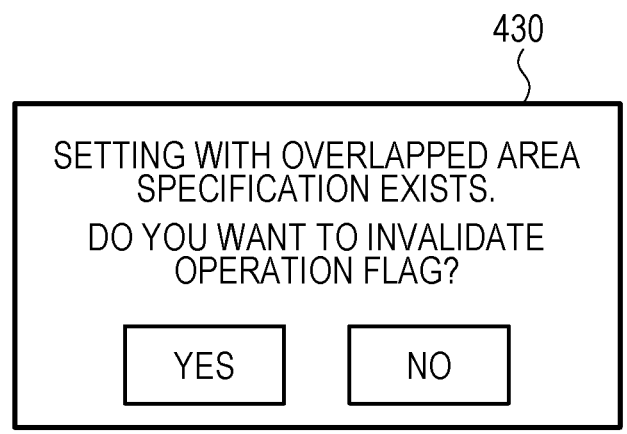
FIG. 14 illustrates an example of an invalidation selecting screen.

In S82, the system control unit 103 performs the processing for urging the user to select whether or not the operation flag of the previous setting information is to be invalidated to exclude the previous setting information from the setting information used for the image analysis processing. Herein, the system control unit 103 performs display control for displaying, for example, an invalidation selecting screen 430 illustrated in FIG. 14 on the display unit 201 of the client apparatus 200 and urges the user to select whether or not the operation flag of the previous setting information is to be invalidated. Then, the system control unit 103 obtains the selection result of the user with respect to the invalidation selecting screen 430 and executes the processing in accordance with the obtained selection result.

As described above, in a case where the user sets plural pieces of setting information related to the image analysis processing, when it is determined that the specified areas are overlapped with each other, the camera 100 according to the present embodiment determines the flag information included in the previous setting information. Then, the processing executed is decided in accordance with the determination result.

Specifically, in a case where the operation flag included in the previous setting information is valid, the user is urged to select whether or not the operation flag of the previous setting information is to be invalidated. On the other hand, in a case where the operation flag included in the previous setting information is invalid, since the probability that the previous setting information is unwanted setting information is high, the user is urged to select whether or not the previous setting information is to be deleted.

With this configuration, it is possible to appropriately create the new setting information without impairing the operation desired by the user. Since the method of deleting the setting information in accordance with the flag information and the method of keeping the setting information by invalidating the operation flag are switched when the previous setting information is excluded from the setting information used for the image analysis processing, it is possible to appropriately delete the unwanted setting information from the recording unit 110.

Fifth Embodiment

Next, a fifth embodiment of the present invention will be described.

According to the fifth embodiment, a case where an object in an image is detected by using an image recognition technology, and an area is specified on the basis of information of a position and a size of the detected object will be described.

For example, when an outdoor monitoring image is taken as an example, an object to be recognized includes constructions, road, green space, sea and river, mountain, sky, and the like. According to the present embodiment, a priority is set to these object types, and the processing with respect to the setting information where the areas are overlapped with each other is decided in accordance with the priority. Herein, the objects are classified into a plurality of groups, and each priority is decided.

For example, in the case of the objects in the above-described monitoring image, object information of the road (including a sidewalk) is set as a group 1. Object information of the constructions such as a building or a house is set as a group 2. Object information of other objects is set as a group 3. In this case, the group 1 is set to have the highest priority since the area is specified for a purpose of human or vehicle detection or the ROI in many cases, and the group 2 and the group 3 are set to have the descending priority in the stated order. The above-described group classification result is added into the setting information as the object type. It should be noted that the user may manually specify the group.

The flow of the function setting processing executed by the camera 100 according to the present embodiment is similar to that of FIG. 5. It should be noted however that the procedure of the overlapped area determination processing in S5 differs.

Figure 15:
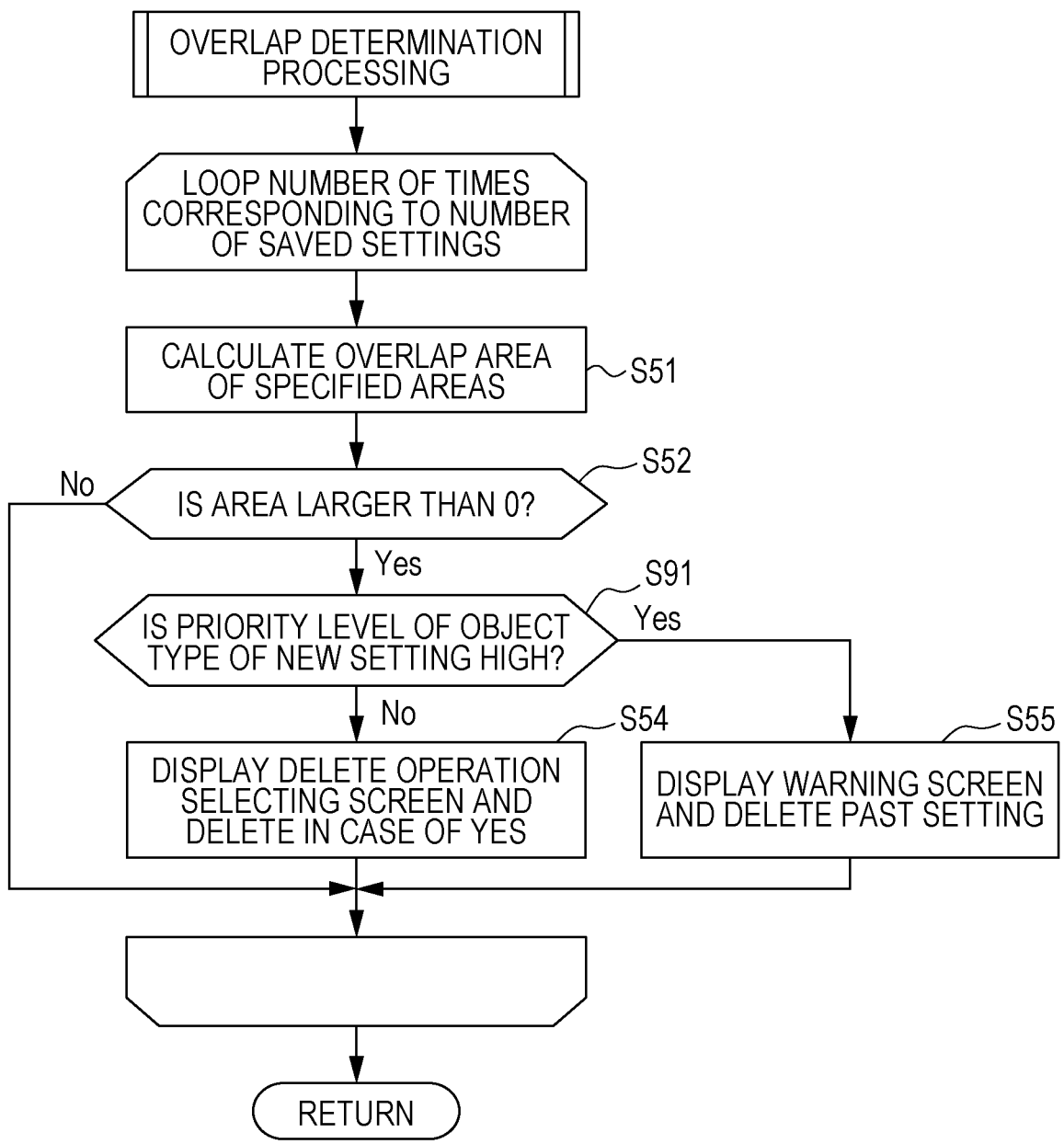
FIG. 15 is a flow chart illustrating a procedure of the overlap determination processing according to a fifth embodiment.

FIG. 15 is a flow chart illustrating a procedure of the overlapped area determination processing executed by the camera 100 in S5 in FIG. 5. This processing in FIG. 15 is similar to the processing in FIG. 7 except that the processing in S53 is deleted and the processing in S91 is added. Therefore, the part that executes the same processing as that in FIG. 7 is assigned with the same step number as that in FIG. 7, and a part where the processing is different will be mainly described below.

The system control unit 103 determines that the overlap of the areas exists in a case where it is determined in S52 that the area of the overlapped area is larger than 0 and shifts to S91. The system control unit 103 compares the object information included in the previous setting information with the object information included in the new setting information. In a case where it is determined that the priority of the object information included in the new setting information is lower than or equal to the priority of the object information included in the previous setting information, the system control unit 103 shifts to S54. On the other hand, in a case where it is determined that the priority of the object type included in the new setting information is higher than the priority of the object information included in the previous setting information, the system control unit 103 shifts to S55.

As described above, in a case where the user sets plural pieces of setting information related to the image analysis processing, when it is determined that the specified areas are overlapped with each other, the camera 100 according to the present embodiment determines the object information used for the decision on the specified area. Then, the processing to be executed is decided in accordance with the determination result. With this configuration, the processing with respect to the setting information where the area are overlapped with each other can be executed while the priority of the object type is taken into account, and it is possible to appropriately create the new setting information without impairing the operation desired by the user.

MODIFIED EXAMPLES

According to the above-described respective exemplified embodiments, the case has been described where the new setting information created by the user operation and the previous setting information recorded in the recording unit 110 are compared with each other to determine the overlap of the specified areas. However, the pieces of setting information corresponding to the comparison targets are not limited to the above and may be the mutual pieces of setting information related to the image analysis processing of the same type. That is, the plural pieces of setting information related to the image analysis processing of the same type which are recorded in a predetermined memory or the like may be compared with each other, or the plural pieces of setting information related to the image analysis processing of the same type which are continuously created by the user operation may be compared with each other.

OTHER EXEMPLIFIED EMBODIMENTS

The exemplified embodiments of the present invention can also be realized by processing in which a program that realizes one or more functions of the above-described exemplified embodiments is supplied to a system or an apparatus via a network or a storage medium, and one or more processors in a computer of the system or the apparatus read out the program to be executed. In addition, the exemplified embodiments of the present invention can be realized by a circuit that realizes one or more functions (for example, an application specific integrated circuit (ASIC)).

According to the exemplified embodiments of the present invention, the setting information including the area specification can be appropriately created, and it is possible to suppress the number of occasions where the undesired image analysis result is obtained.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-154497 filed Aug. 9, 2017, which is hereby incorporated by reference herein in its entirety.

What is claimed is:

1. An information processing apparatus comprising a computer executing instructions that, when executed by the computer, cause the computer to function as:
    an obtaining unit configured to obtain setting information for processing related to an image, the setting information indicating at least a specified area in the image to be processed;
    a determination unit configured to determine whether a second specified area of second setting information overlaps with a first specified area of first setting information, in a case where (i) the obtaining unit obtains the second setting information in a state where the first setting information has been set and (ii) both of the first and second setting information are for a same type of processing related to the image; and
    a control unit configured to cause a display unit to display a setting screen for selecting whether to exclude processing of the first setting information from processing to be executed, in a case where the determination unit determines that the second specified area overlaps with the first specified area.

2. The information processing apparatus according to claim 1, further comprising:
    a display control unit configured to display the image on a display unit,
    wherein the obtaining unit is configured to accept a specification of an area on the image displayed by the display control unit to obtain the first setting information.

3. The information processing apparatus according to claim 1, further comprising:
    a storing unit configured to store the setting information,
    wherein the obtaining unit is configured to obtain the first setting information from the storing unit.

4. The information processing apparatus according to claim 1, wherein, in a case where it is determined that the first and second specified area are overlapped, the determination unit determines an overlapped amount of an overlapped area between the first and second specified area.

5. The information processing apparatus according to claim 1,
    wherein the first and second setting information further includes numeric value information representing a quantization amount for compressing an area outside the respective specified area in the image, and
    wherein, in a case where it is determined that the first and second specified area are overlapped, the determination unit determines a magnitude relationship between the numeric value information included in the first setting information and the numeric value information included in the second setting information.

6. The information processing apparatus according to claim 1,
wherein the first and second setting information further includes flag information for setting a valid or invalid status of the setting information, and
wherein, in a case where it is determined that the first and second specified area are overlapped, the determination unit determines the flag information included in the first setting information and the flag information included in the second setting information.

7. The information processing apparatus according to claim 1,
wherein the first and second setting information further includes object information used for deciding the respective specified area in the image, and
wherein, in a case where it is determined that the first and second specified area are overlapped, the determination unit determines the object information included in the first setting information and the object information included in the second setting information.

8. The information processing apparatus according to claim 1,
wherein the first and second setting information further includes time information indicating a time when the setting information is created, and
wherein the control unit decides an order of the setting information corresponding to a target of the processing to be executed on a basis of the time information.

9. The information processing apparatus according to claim 1, wherein the control unit is configured to cause the display unit to display the determination result of the determination unit.

10. The information processing apparatus according to claim 1, wherein the instructions further causes the computer to function an imaging unit configured to capture the image and a changing unit configured to be able to change an imaging direction and a viewing angle of the imaging unit.

11. An information processing method related to image analysis processing, the information processing method comprising:
obtaining setting information for processing related to an image, the setting information indicating at least a specified area in the image to be processed;
determining whether a second specified area of second setting information overlaps with a first specified area of first setting information, in a case where (i) the obtaining obtains the second setting information in a state where the first setting information has been set and (ii) both of the first and second setting information are for a same type of processing related to the image; and
causing a display unit to display a setting screen for selecting whether to exclude processing of the first setting information from processing to be executed, in a case where it is determined that the second specified area overlaps with the first specified area.

12. A non-transitory computer-readable storage medium that stores a program for causing a computer to execute an information processing method, the information processing method comprising:
obtaining setting information for processing related to an image, the setting information indicating at least a specified area in the image to be processed;
determining whether a second specified area of second setting information overlaps with a first specified area of first setting information, in a case where (i) the obtaining obtains the second setting information in a state where the first setting information has been set and (ii) both of the first and second setting information are for a same type of processing related to the image; and
causing a display unit to display a setting screen for selecting whether to exclude processing of the first setting information from processing to be executed, in a case where it is determined that the second specified area overlaps with the first specified area.

* * * * *